US006979160B2

(12) United States Patent
Babej et al.

(10) Patent No.: US 6,979,160 B2
(45) Date of Patent: Dec. 27, 2005

(54) FIXING ELEMENT

(75) Inventors: Jiri Babej, Lich (DE); Richard Humpert, Rosbach v.d.H (DE); Ines Rattei, Dresden (DE)

(73) Assignee: Profil Verbindungstechnik GmbH & Co., (DE)

( * ) Notice: Subject to any disclaimer, the term of this patent is extended or adjusted under 35 U.S.C. 154(b) by 0 days.

(21) Appl. No.: 10/489,792

(22) PCT Filed: Sep. 6, 2002

(86) PCT No.: PCT/EP02/10001

§ 371 (c)(1),
(2), (4) Date: Aug. 26, 2004

(87) PCT Pub. No.: WO03/029667

PCT Pub. Date: Apr. 10, 2003

(65) Prior Publication Data

US 2005/0008453 A1    Jan. 13, 2005

(30) Foreign Application Priority Data

Sep. 25, 2001 (DE) ............................. 101 47 076

(51) Int. Cl.[7] ............................................. F16B 37/04
(52) U.S. Cl. .................... 411/179; 411/181; 411/107; 29/432.2
(58) Field of Search ................. 411/177, 179, 181, 411/184, 185, 187, 107, 180; 29/432.1, 432.2

(56) References Cited

U.S. PATENT DOCUMENTS

| | | | | |
|---|---|---|---|---|
| 2,208,532 A | * | 7/1940 | Woodward | 411/187 |
| 3,276,499 A | * | 10/1966 | Reusser | 411/179 |
| 3,299,500 A | * | 1/1967 | Double | 29/432.2 |
| 3,878,599 A | * | 4/1975 | Ladouceur et al. | 29/432.2 |
| 3,894,331 A | * | 7/1975 | Ragettli | 29/512 |
| 4,459,073 A | * | 7/1984 | Muller | 411/176 |
| 4,543,701 A | * | 10/1985 | Muller | 29/432.1 |
| 4,555,838 A | * | 12/1985 | Muller | 29/432.1 |
| 4,557,649 A | * | 12/1985 | Jeal | 411/40 |
| 4,765,057 A | * | 8/1988 | Muller | 29/716 |
| 4,915,558 A | * | 4/1990 | Muller | 411/179 |
| 5,067,224 A | * | 11/1991 | Muller | 29/432.2 |
| 5,092,724 A | * | 3/1992 | Muller | 411/179 |

(Continued)

FOREIGN PATENT DOCUMENTS

DE          30 03 908 C2      8/1981

(Continued)

Primary Examiner—Katherine Mitchel
(74) Attorney, Agent, or Firm—Greenberg Traurig LLP; Eugene C. Rzucidlo

(57) ABSTRACT

A fixing element comprising a fixing section and a tubular stamped or riveted section in which the stamped or riveted section enable the fixing element to be placed on a metal part and the fixing section enables an object to be placed on the metal part. A bearing surface on a transition region between the fixing section and the stamped or riveted section extends in a radial or conical manner and optionally has torsional fixing features. The tubular stamped or riveted section free front end has a conical cutting surface which is divergent on the radially inner side in the direction of the free front end area and a rounded impact and traction surface on the radially outer side. The cutting, impact and traction surfaces meet at an annular edge on the free front end of the stamped or riveted section and are shaped to prevent shavings from occurring.

11 Claims, 9 Drawing Sheets

U.S. PATENT DOCUMENTS

Figure 6:
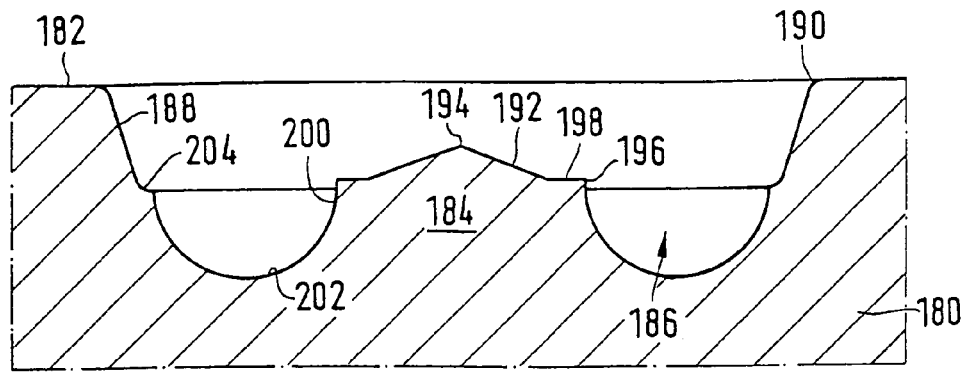

| | | | |
|---|---|---|---|
| 5,644,830 A * | 7/1997 | Ladouceur et al. | 29/432.2 |
| 6,122,816 A * | 9/2000 | Ladouceur | 29/509 |
| 6,257,814 B1 * | 7/2001 | Muller | 411/176 |
| 2003/0101566 A1 * | 6/2003 | Ladouceur | 29/432.2 |
| 2004/0130932 A1 * | 7/2004 | Ladouceur | 365/154 |
| 2004/0141826 A1 * | 7/2004 | Babej et al. | 411/181 |
| 2004/0202524 A1 * | 10/2004 | Ross et al. | 411/181 |

FOREIGN PATENT DOCUMENTS

| | | |
|---|---|---|
| DE | 34 47 006 C2 | 7/1985 |
| DE | 34 46 978 C2 | 8/1985 |
| DE | 38 35 566 C2 | 5/1989 |
| DE | 100 15 239 A1 | 10/2001 |
| GB | 2 152 862 A | 8/1985 |
| WO | WO 00/45056 | 8/2000 |

* cited by examiner

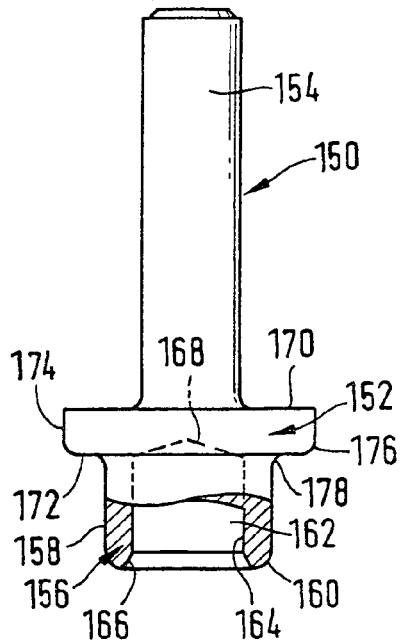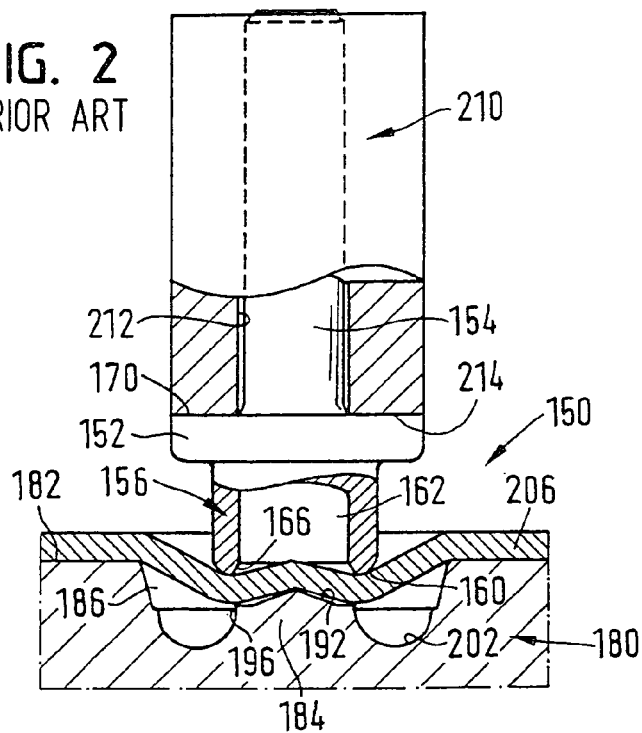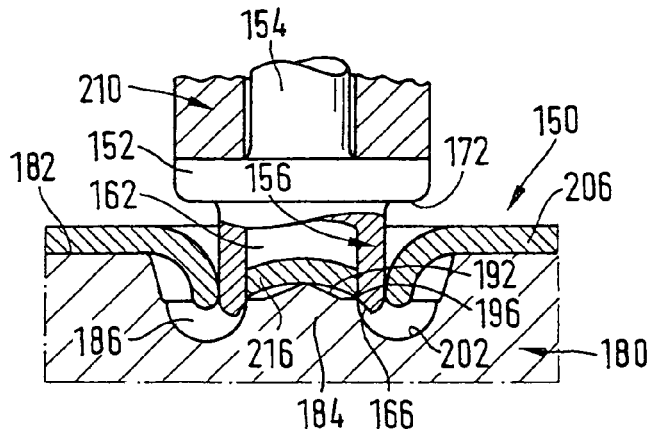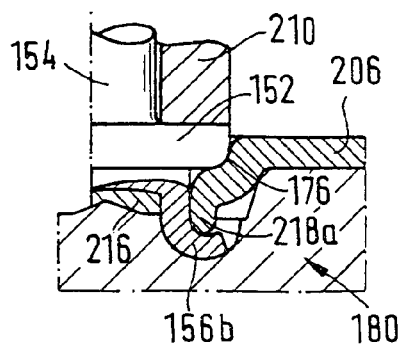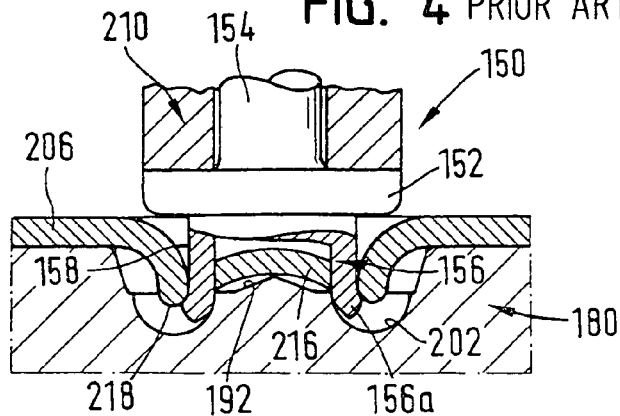

FIXING ELEMENT

The present invention relates to a fastener element having a fastener section and a tubular piercing or rivet section with the piercing or rivet section being designed for the attachment of the fastener element to a sheet metal part and with the fastener section being designed for the attachment of an article to the sheet metal part, wherein, in the region of the transition from the fastener section into the piercing or rivet section a radially or conically extending contact surface is provided which optionally has features providing security against rotation and the tubular piercing or rivet section ahs at its free end face on the radially inner side a conical inclined surface or cutting surface which diverges in the direction of the free end face and at the radially outer side a rounded punching an drawing surface, with the oblique surface or cutting surface and the pressing or drawing surface meeting at a annular end face edge at the free end face of the piercing or rivet section.

Fastener elements of this kind have been sold by the company Profil Verbindungstechnik GmbH & Co. KG in various forms under the designations SBF, SBK, RSF and RSK for many years. The elements themselves and also the method for the attachment of the elements and the die buttons that are used are described in detail amongst other things in the German patent DE 34 47 006 C2, DE 34 46 978 C2 and DE 38 35 566 C2.

Fastener elements of this kind are either introduced in self-piercing manner into the sheet metal part so that the element has a piercing or rivet section. They can however also be introduced into pre-holed sheet metals, with the pre-holing frequently taking place using a so-called preceding hole punch which pierces the sheet metal part directly before or during the attachment of the fastener element. This possibility only exists for fastener elements which are formed as hollow body elements, for example nut elements, because the hole punch has to pass through the fastener element.

The possibility also exists, likewise with hollow body elements, of providing them with a piercing and rivet section, of piercing the sheet metal part with the piercing or rivet section and of removing the slug which arises and which is trapped inside the tube and rivet section by using a follow up ejection pin.

Even when using the above-named element with pre-holed sheet metal parts the piercing or riveting section has to provide a not inconsiderable deformation work at the sheet metal part because it has to take care of the deformation of the sheet metal part to a tubular collar in the region of the rivet connection. The piercing or rivet section is subsequently deformed radially outwardly around the free end face of the tubular collar in order to form a recess for the tubular collar of U-shaped cross-section when viewed in a radial cross-section.

The requirements placed on the piercing or rivet section, irrespective of whether or not pre-holing is used, are thus to have adequate stability in order to be able to carry out the deformation which is required and, after the formation of the rivet bead, to achieve an adequate strength in the region of the rivet bead so that the strength of the connection which is aimed at is ensured. This is required for the firm attachment of an article to the sheet metal part. For a fastener element this moreover signifies that the strength of the piercing or rivet section must correspond to the strength class of the screw. During the attachment of the fastener element to a sheet metal part the piercing or rivet section may not buckle. On the other hand the deformability must be present so that the piercing or rivet section can be reshaped into the rivet bead which is of U-shape in radial cross-section.

These contrary demands lead to the radial wall thickness of the tubular piercing or rivet section having to have a clear association with the effective size of the fastener element. Under the designation "effective size of the fastener element" is to be understood the strength which is demanded from the fastener element as such. If, for example, the fastener element is a bolt element then the effective size of the fastener section corresponds to the outer diameter of the thread cylinder, i.e. with a fastener element having a metric thread of 5 mm diameter the effective size of the fastener section likewise amounts to 5 mm. For a fastener element with a thread cylinder of 6 mm diameter the effective size of the fastener section is 6 mm etc. If one is concerned with a nut element the effective size is determined in precisely the same manner, i.e. with a nut element of for example 8 mm internal diameter the effective size of the fastener section is to be assumed to be 8 mm. If, in contrast, it is a bolt element which is provided with a shaft part and which executes a journaling function or is designed to receive a spring clip or to form a snap connection, then the outer diameter of the shaft part counts as the effective size. For example, with a shaft part having a diameter of 10 mm, the effective size of the fastener section amounts to 10 mm.

The form of the conical cutting surface which diverges in the direction of the free end face and the form of the rounded pressing and drawing surface provided at the radially outer side of the piercing or rivet section are very precisely determined in the known fastener elements in order to satisy the respective tasks.

In the known elements the cutting surface is formed as a conical surface which has the hypotenuse of an imaginary right-angled triangle with a limb length perpendicular to the central longitudinal axis of the tubular piercing or rivet section of 0.2 mm to 0.3 mm, depending on the effective size of the fastener section. The sense of this conical cutting surface is on the one hand to compress the piercing slug in the radial direction when it is manufactured so that the piercing slug is trapped in the piercing or rivet section. This jamming stiffens the piercing or rivet section during the subsequent deformation of the same, which is of advantage. On the other hand, the conical cutting surface serves to deflect the piercing or rivet section radially outwardly in collaboration with a central part of the die button. Both functions lead to a situation in which this cutting surface is made as broad as possible from the point of view of its design.

The rounded pressing and drawing surface in the known elements has a centre of curvature which was placed on the inner wall of the piercing or rivet section, with the radius of curvature having a length which corresponds to the radial wall thickness of the tubular piercing or rivet section. In other respects the centre of curvature was so placed in the known elements that the rounded pressing and drawing surface runs tangentially into the cylindrical outer surface of the tubular piercing or rivet section, with this rounded pressing and drawing surface at the free end of the fastener element, which forms a annular end face edge with the cutting surface at the free end face of the piercing or rivet section, meeting this cutting surface in such a way that a tangent to the rounded pressing and drawing surface at the annular end face edge forms an acute angle to the central longitudinal axis of the tubular piercing or rivet section which is significantly less than 90°.

Even when the said fastener elements have been successfully used in practice for many years they have a disadvantage, namely that the attachment of the elements, irrespective of whether it takes place with or without pre-holing, leads to the formation of small chips which, in the course of time, stick in the region of the die buttons or elsewhere in the tools that are used and can lead to jamming and deformations, also of the sheet metal parts which are being processed, which are entirely undesirable.

The cause for these small chips is extremely difficult to understand since one cannot visualize the way the chips arise in a large press, because the working area consists of solid metal and there is no possibility of providing so to say observation windows which would enable the manufacturing process to be observed without substantially impairing the course of the manufacturing process.

The object of the present invention is to set forth a modified form of fastener elements of the initially named kind which do not lead to the formation of chips, or only lead to the formation of chips to a substantially lesser degree, without the attachment method which has otherwise proved itself (with or without pre-holding) having to be changed and without the technical values of the connections which are achieved deteriorating, and it should also be possible to continue to use the die button which have previously been used.

In order to satisfy this object provision is made in accordance with the invention that the conical cutting surface forms the hypotenuse of an imaginary right angled triangle with a limb length perpendicular to the central longitudinal axis of the tubular piercing or rivet section of 0.10 mm±0.03 mm, that the radial wall thickness of the tubular piercing or rivet section is dimensioned as a function of the effective size of the fastener section; that the rounded pressing and drawing surface has a radius of curvature which is 0.1 mm±0.03 mm smaller than the respective radial wall thickness and that the centre of curvature of the rounded pressing and drawing surface lies on the surface of an imaginary cylinder parallel to the axis which extends away from the annular end face edge in the direction of the fastener section and is so positioned at a point along the piercing or riveting section on the surface of the imaginary axially parallel cylinder that a tangent to the rounded pressing and drawing surface stands perpendicular to the central longitudinal axis at the annular end face edge.

Especially preferred embodiments of the fastener element can be found in the subordinate claims.

Despite the difficulties involved when observing the method it has proved possible to ascertain that the chips have in principle three origins. On the one hand they arise when the sheet metal part is cut through. However they also arise when the sheet metal part is drawn into the tubular collar and they furthermore arise during the rolling of the piercing or rivet section into the recess of the die button around the drawn tubular collar region.

It has furthermore been found, in accordance with the invention that through a special shaping of the piercing or rivet section in the region of the conical cutting surface and of the rounded pressing and drawing surface the tendency to chip formation can be substantially reduced and thus the object of the invention can be satisfied.

Figure 19:
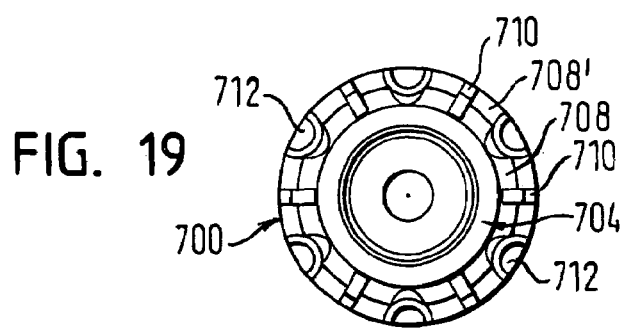
Figure 20:
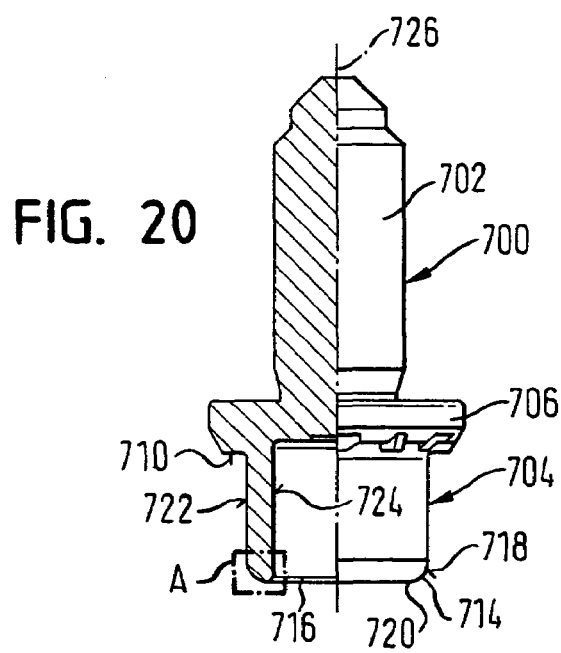

The invention will be explained in more detail in the following with reference to the drawings in which are shown:

FIGS. 1 to 12 the Figures from the German patent 34 47 006 which show the method for the attachment of the fastener elements to sheet metal parts in the known form, with both a bolt element and also a nut element being shown and with an ejection pin being used with the nut element to remove the piercing slug, FIGS. 13 to 18 the FIGS. 4, 5 and 7 to 10 of the German patent 34 46 978 C2 which show the attachment of a nut element using a preceding hole punch, FIGS. 19, 20 a fastener element in the form of a bolt element in accordance with the present invention, and indeed in the form of an end view and a side view partly sectioned in the longitudinal direction and FIGS. 21–24 the design of the piercing and rivet section in the region A of FIG. 20 in dimensioned form for bolt elements for the diameters M5, M6, M8 and M10 respectively.

Since the FIGS. 1 to 12 and 13 to 18 have been taken from the German patents DE 34 47 006 C2 and DE 34 46 978 C2 and are fully described there they will only be briefly described here by way of explanation, particularly since the method sequence is straightforwardly evident from the individual drawings.

The fastener element of FIG. 1 is a stud bolt element 150. This stud bolt element 150 comprises a shaft part 154, shown here without thread, and a head part 152 with a radial flange and a tubular piercing and rivet section 156. In this embodiment the jacket wall 158 of the tubular piercing and rivet section is substantially of circularly cylindrical shape and terminates in a rounded pressing and drawing edge 160 at the free end face of the tubular piercing and rivet section.

The inner wall 164 of the piercing and rivet section is likewise substantially cylindrical in this embodiment and terminates in a conical cutting surface 166 which meets the rounded pressing and drawing edge 160 at a ring-like end face edge at the free end face of the piercing and rivet section.

Figure 8:
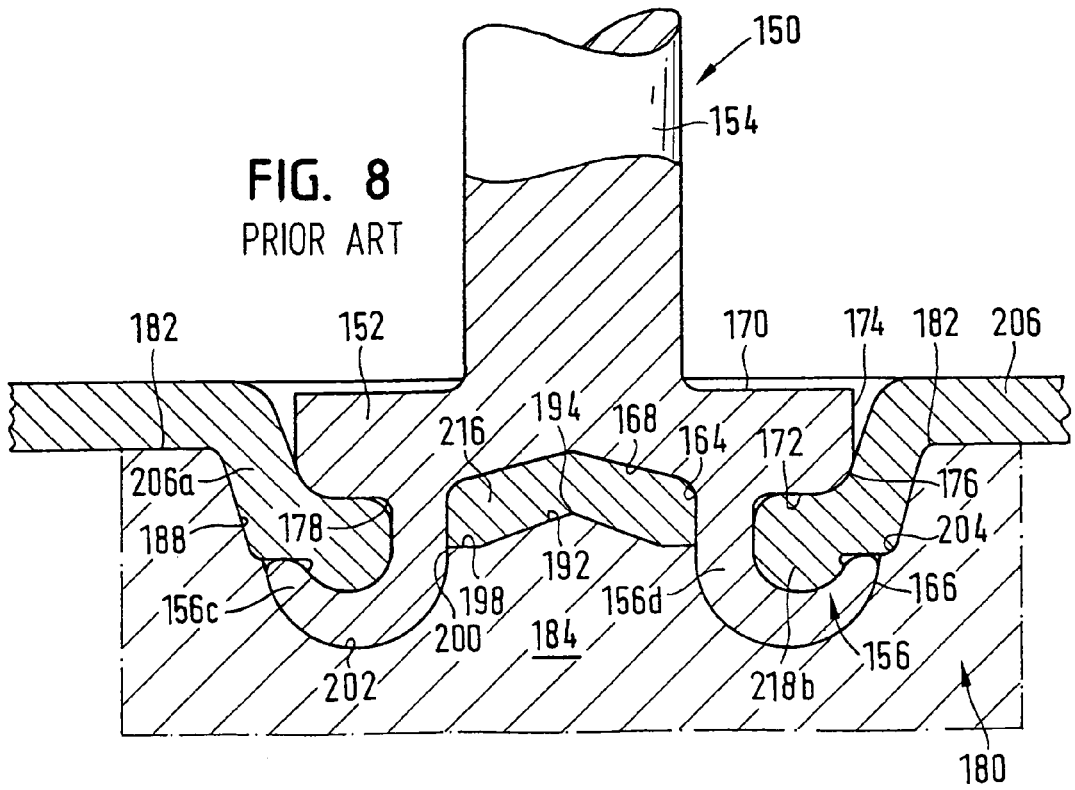

As can be seen from FIG. 2 a sheet metal part 206 is supported in a press tool by means of a die button 180 and the fastener element 150 is so pressed against the sheet metal part 206 by means of a press tool in the form of a plunger of a press that, as shown in FIG. 3, a piercing slug 216 arises and the sheet metal part is drawn into a tubular collar 218 (FIG. 4). The piercing slug 216 is pressed inside the tubular piercing and rivet section by a plunger projection 184 of the die button and the piercing and rivet section 156 is rolled as a result of the rounded rolling surface 202 of the die button 180 radially outwardly around the free end face of the tubular collar 218 forward the formation of a rivet bead until the end position of FIG. 8 is reached.

Figure 7:
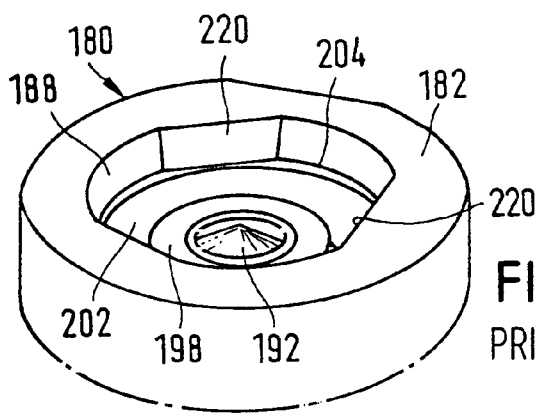
Figure 9:
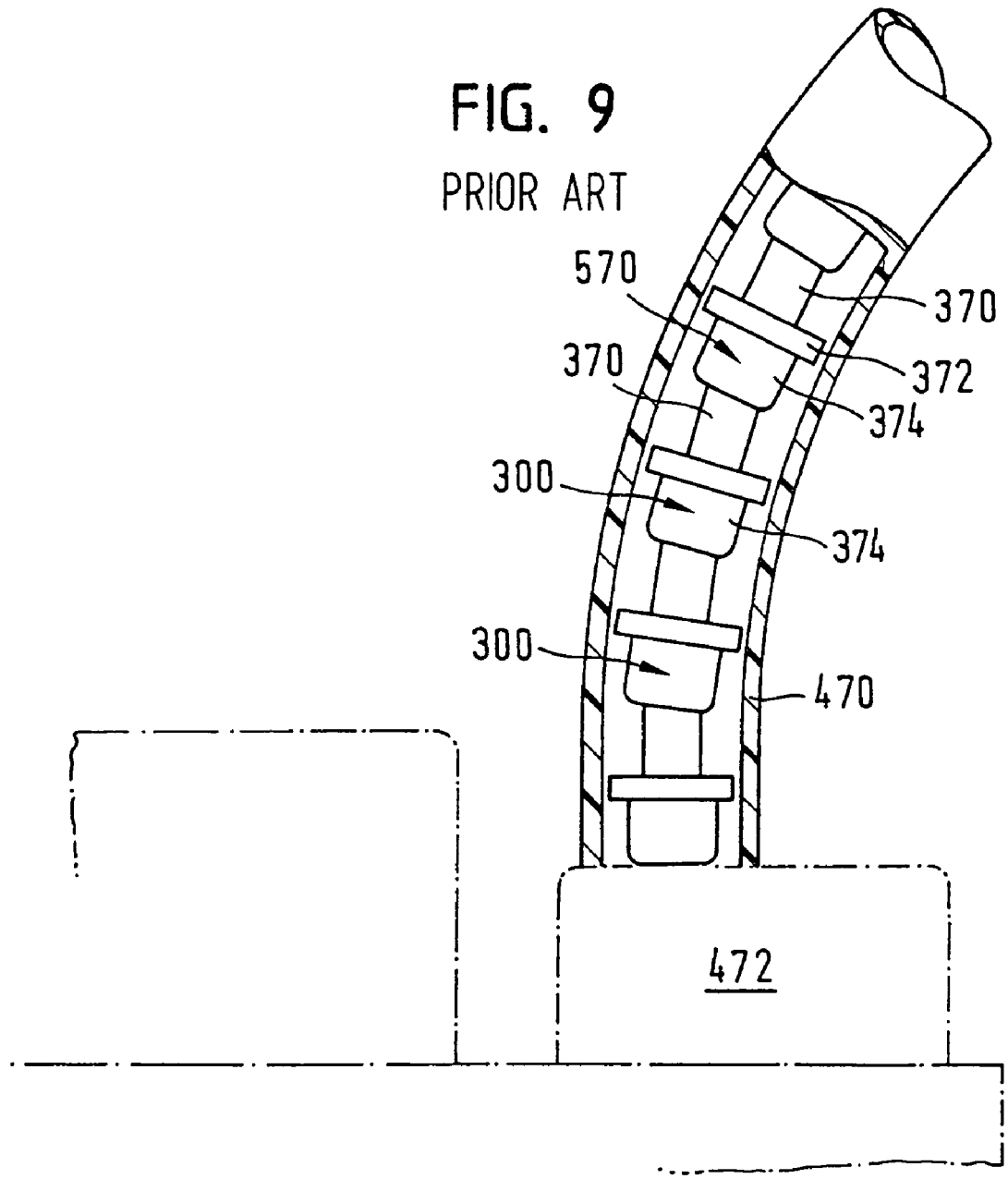

FIG. 9 shows how a plurality of bolt elements can be introduced one after the other into a piercing head 472 of a press so that for each stroke of the press one bolt element can be stamped into a new sheet metal part and riveted to the latter. Even when FIG. 7 shows a particular shape of the die button, this can also have the form of a body of rotation, i.e. the planar coining regions 220 shown in FIG. 7 do not have to be present.

Figure 10:
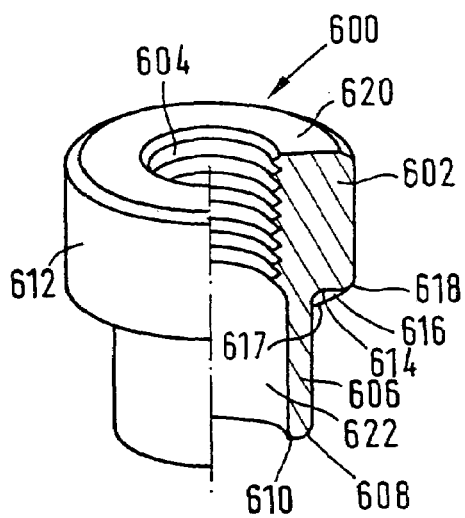
Figure 11:
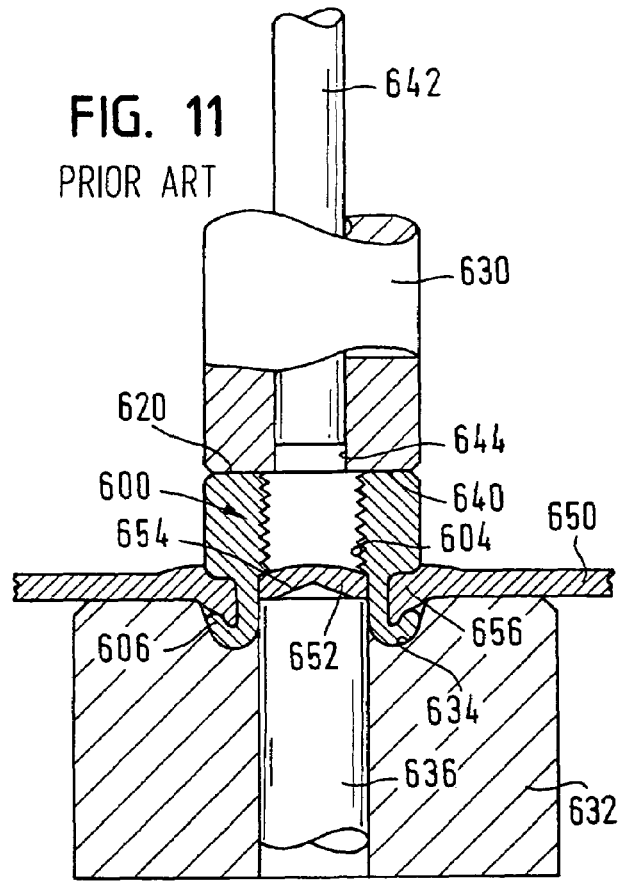
Figure 12:
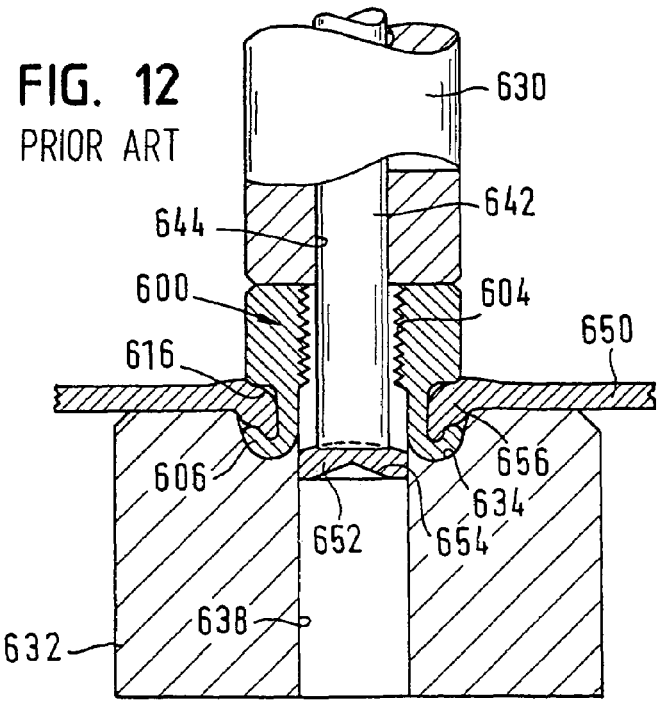
Figure 13:
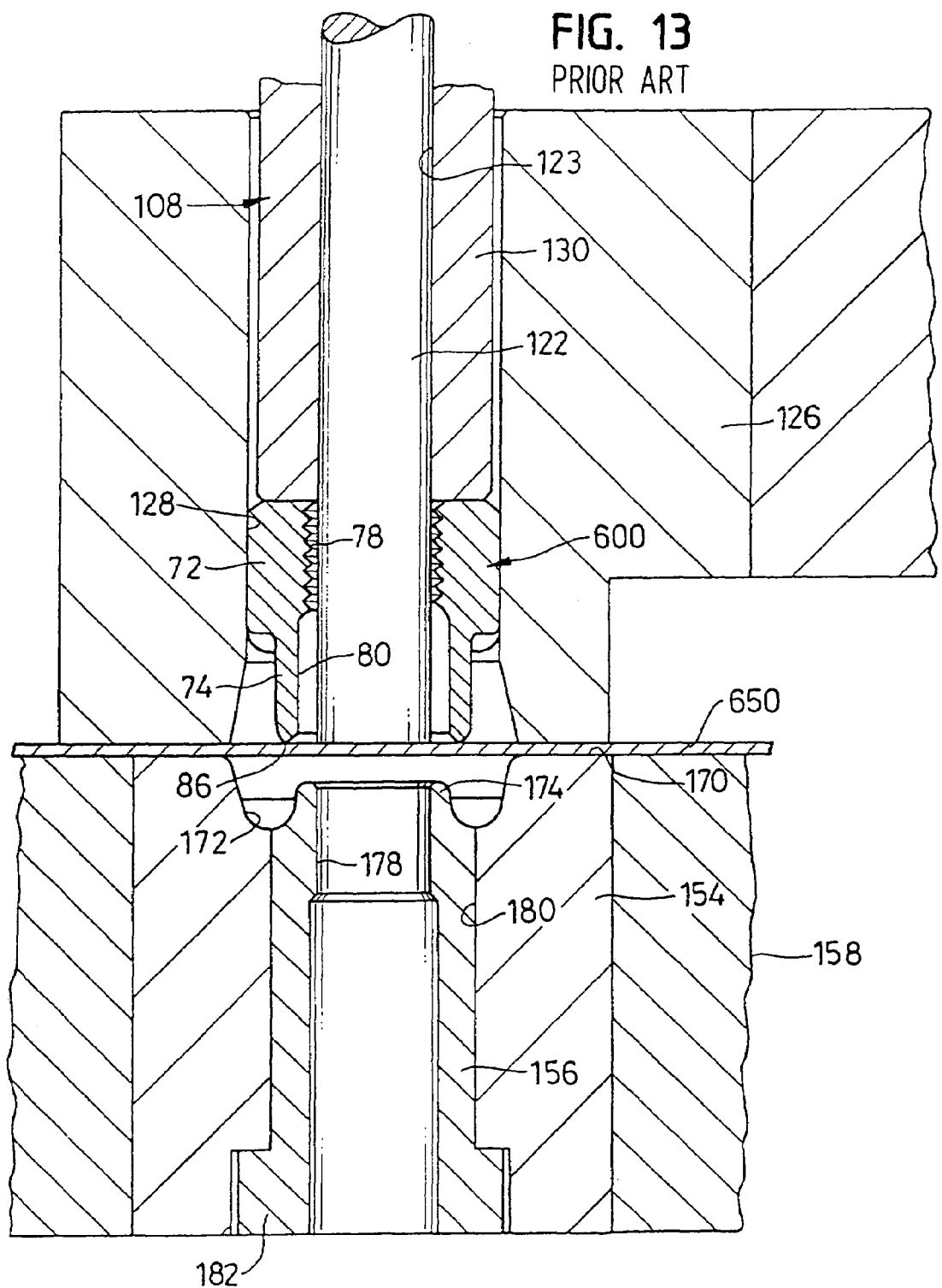
Figure 14:
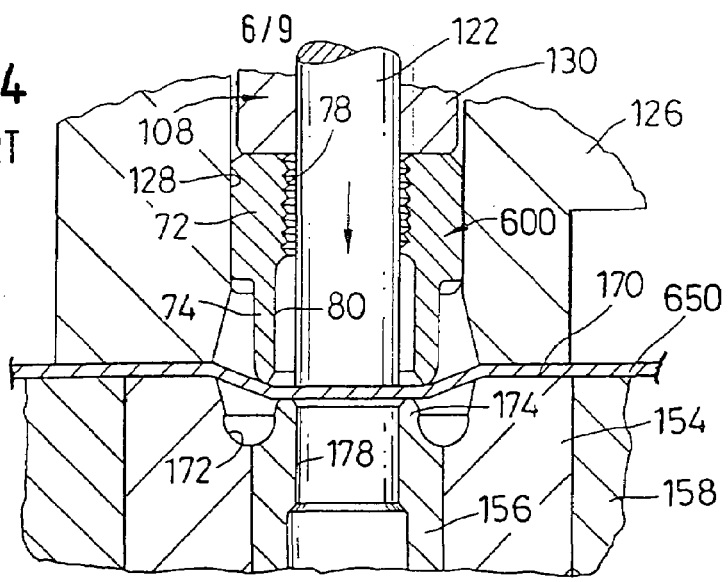
Figure 15:
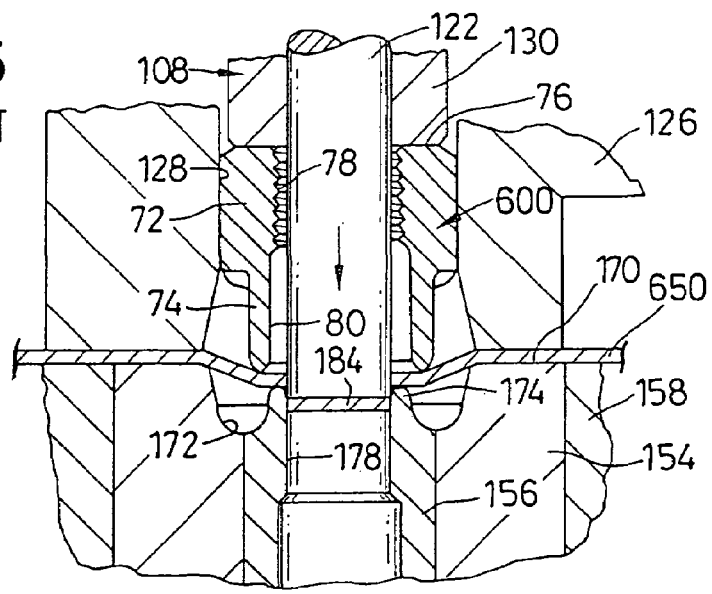
Figure 16:
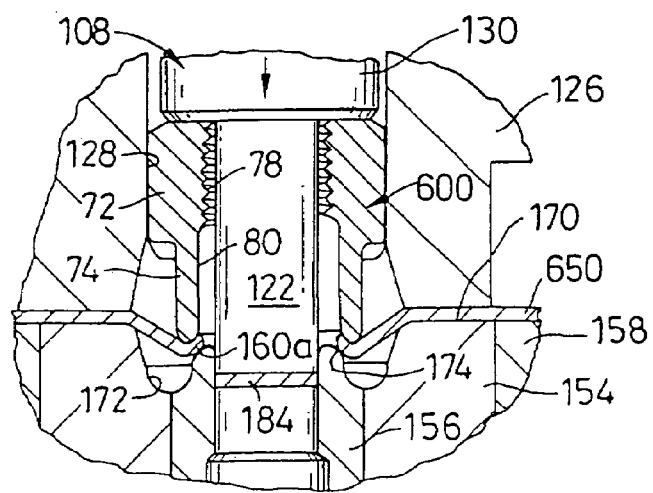
Figure 17:
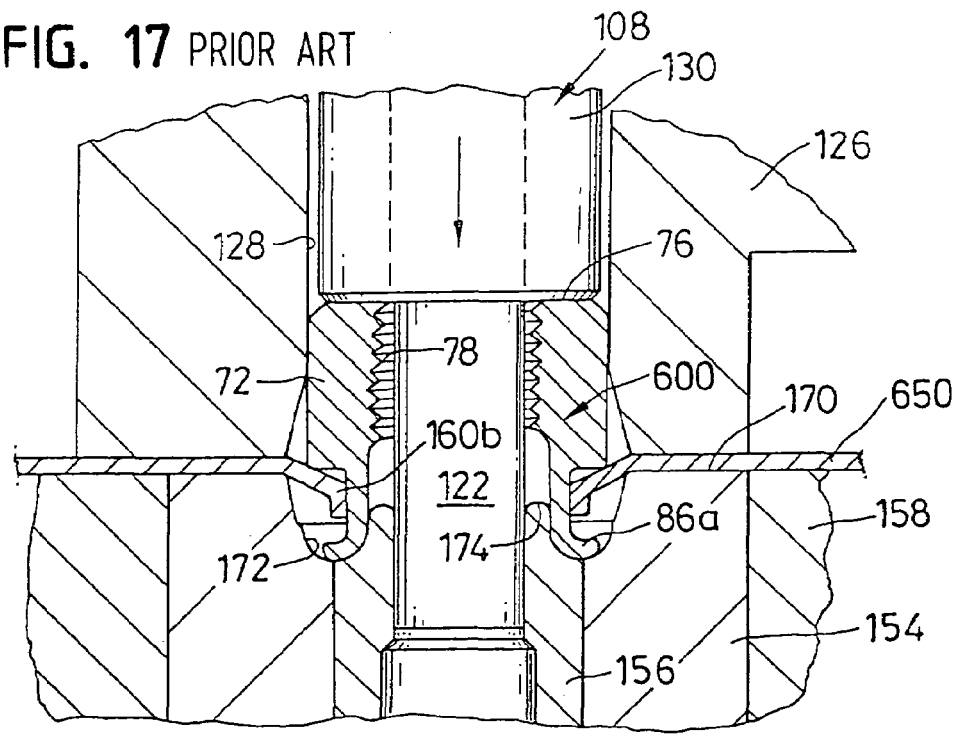
Figure 18:
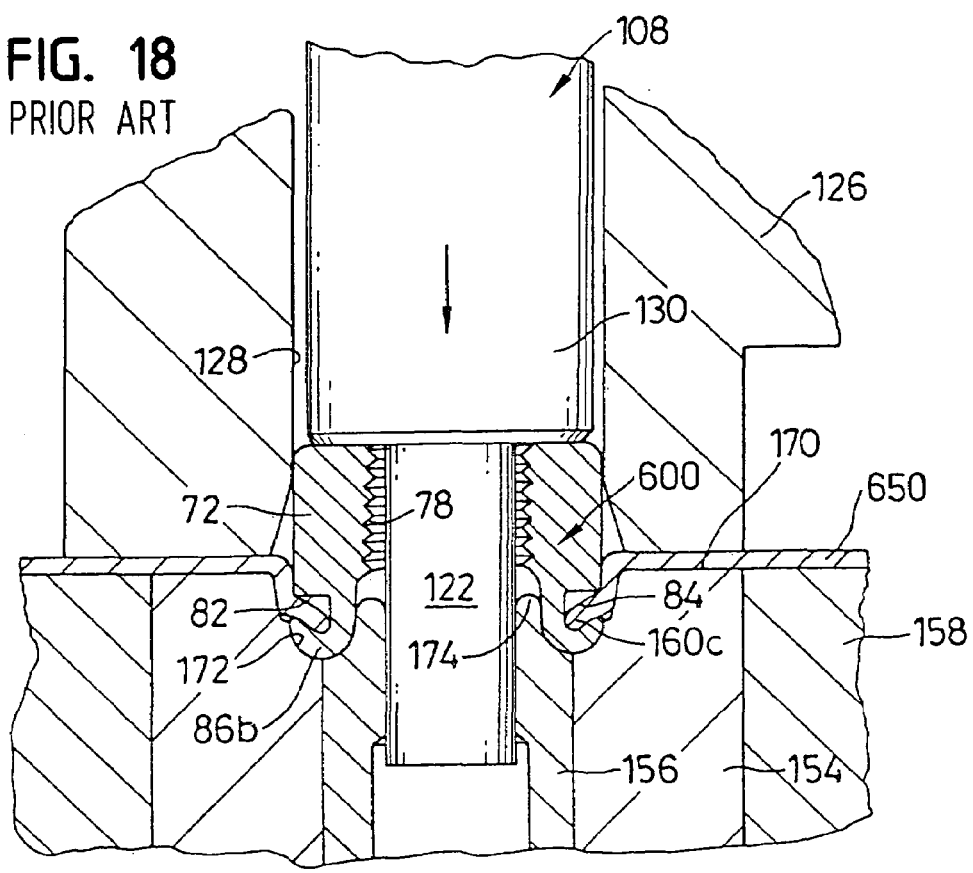

The FIGS. 10 to 12 show that a nut element can be used instead of a bolt element and furthermore show how, in this embodiment, the nut element is admittedly introduced in a self-piercing manner into the sheet metal part 650, the piercing slug is however subsequently pressed out by means of an ejection pin 642 and disposed of via a central passage 638 of the die button 632.

The FIGS. 13 to 18 show how a nut element 600 can be inserted into a sheet metal part 650 using a so-called preceding hole punch 122 which serves for the pre-holing of the sheet metal part 650 so that the piercing and riveting section has a pressing and drawing function here, but is not used for the piercing of the sheet metal part. Independently of the precise layout of the attachment method and of the fastener element used all elements shown are provided with a piercing or rivet section, which is provided at its free end face with a conical inclined surface or cutting surface at the radially inner side and at the radially outer side with a rounded pressing and drawing edge, with the rounded pressing and drawing edge meeting the conical inclined surface at a annular end face edge of the piercing and rivet section.

As explained above the present invention relates to a special design of the piercing and rivet section in the region of its free end face which ensures the avoidance of chips.

The fastener element of FIGS. 19 and 20 is a bolt element 700 with a fastener section 702 and a tubular piercing or rivet section 704, with the piercing or rivet section being designed for the attachment of the fastener element to a sheet metal part and with the fastener section being designed for the attachment of an article to the sheet metal part. In the region of the transition from the fastener section 702 into the piercing and rivet section a radially extending contact surface 7–8 formed on a flange part 706 is provided here which, in the specific example, is provided with features providing security against rotation in the form of noses 710 and recesses 712. Features providing security has to transmit torques to the sheet metal part in operation, for example when an article is to be secured to the sheet metal part by means of a nut screwed onto the fastener section 702, with a torque arising at the fastener element on a screwing on of the nut as a result of friction and having to be taken up by the sheet metal part. Such torques also arise when the nut is removed and must likewise be carried or transmitted by the connection between the fastener element and the sheet metal part.

The tubular piercing or rivet section has at its free end face 714 a conical cutting surface 716 at the radially inner side and a rounded pressing and drawing surface 718 at the radially outer side, with the cutting surface 716 and the pressing and drawing surface meeting at a annular end face edge 720 at the free end face of the piercing or rivet section.

The tubular piercing or rivet section 704 has a right cylindrical outer wall 722 and a right cylindrical inner wall 724 which are both disposed concentric to the central longitudinal axis 726 of the fastener element.

The design in accordance with the invention of the tubular piercing or rivet section 704 in the region of its free end face, i.e. at the position where the detail A is indicated in FIG. 20 will now be described with reference to FIG. 21 for a fastener element in accordance with FIG. 20 with an effective size of the fastener section of 5 mm, i.e. the outer diameter of the fastener section 702 amounts to 5 mm.

Figure 21:
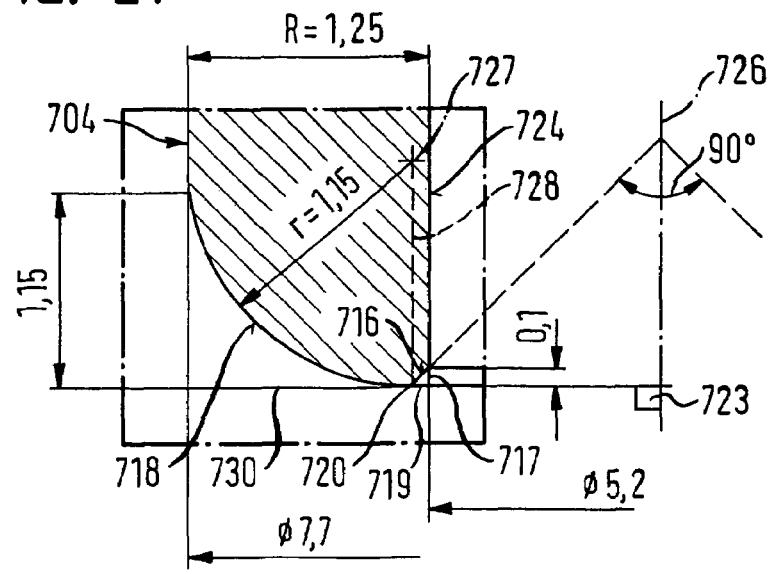

One can see from FIG. 21 that the conical cutting surface 716, when considered in the radial cross section, forms the hypotenuse of an imaginary isosceles right-angled triangle the equal length sides of which are designed with the reference numerals 717, 719. The limb 717 corresponds to the imaginary continuation of the inner wall 724 of the piercing or rivet section 704 from the start of the oblique surface or inclined surface 716 up to the point of intersection with the imaginary radius which goes from the annular end face edge 720 to the longitudinal axis 726, with the section of the radius from the annular end face edge to the intersection point with the imaginary continuation of the inner wall 724 of the piercing or rivet section 704 forming the limb 719. In this example the limbs 717 and 719 each have a limb length of 0.1 mm, and this limb length can amount, in accordance with the invention to 0.1 mm±0.3 mm. Since this is preferably an isosceles triangle, which is however not essential, the cone angle of the conical intersection surface related to the central longitudinal axis 726 is 90°. The distance between the annular end face edge 720 and the radially inner wall 724 of the tubular piercing or rivet section amounts likewise to 0.1 mm (radial distance measured at the annular end face edge 720).

The radial wall thickness R of the tubular piercing or rivet section amounts, in this example of a bolt element of the size M5, to 1.25±0.05 mm. The rounded pressing and drawing surface 718 has, in accordance wit the invention, a radius of curvature which is 0.1 mm (±0.03 mm) smaller than the respective radial wall thickness R (in this example 1.25 mm). Furthermore the centre of curvature 727 of the (circularly) rounded pressing and drawing surface lies on the surface of an imaginary axially parallel cylinder 728 which extends away from the annular end face edge 720 in the direction of the fastener section 702. Furthermore the centre of curvature 727 is so placed at a point along the piercing or rivet section, at the surface of the imaginary axially parallel cylinder 728, that the tangent 730 to the rounded pressing and drawing surface 718 at the transition into the annular end face edge 720 stands perpendicular to the central longitudinal axis of the tubular piercing or rivet section 704, as is indicated at 723. Accordingly the height of the centre of curvature 727 above the annular end face edge 720 is likewise 1.15 mm corresponding to the radius of curvature of the rounded pressing and drawing surface 718.

As a result of the geometrical relationships this design of the free end of the piercing or rivet section 704 leads to the rounded piercing and drawing surface 718 likewise running tangentially into the right cylindrical wall of the tubular rivet section. This also applies to the embodiment of FIG. 22 which recites the correct dimensions for a bolt element in the size M6 in accordance with the invention where the radial wall thickness of the piercing or rivet section 704 likewise amounts to 1.25 mm.

Figure 23:
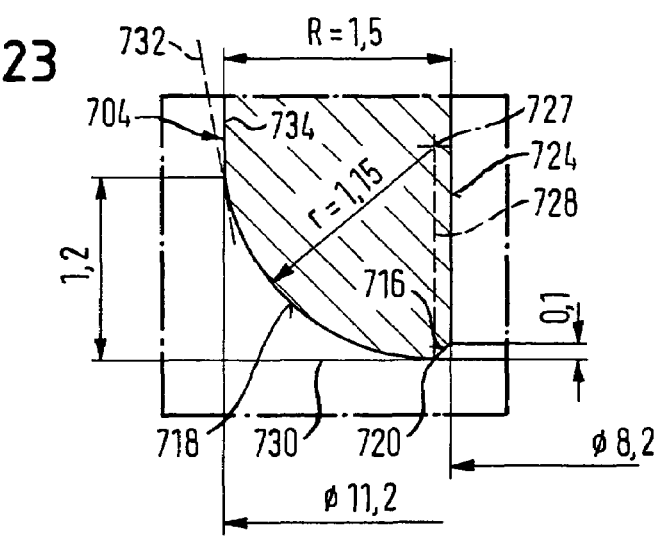
Figure 24:
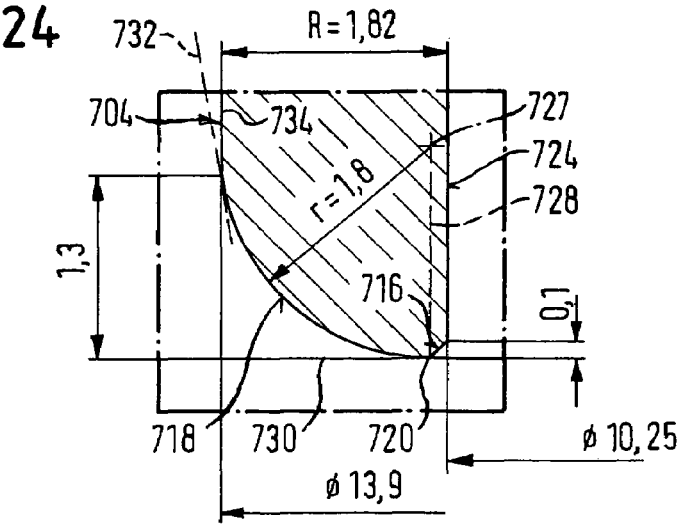

One can see however from the FIGS. 23 and 24 that the relationships with a bolt element of the size M8 or M10 are different, so that here a tangent 732 to the rounded pressing and drawing surface 718 of the piercing or rivet section 704 forms an acute angle with a generatrix 734 of the circular cylindrical wall 722 of the piercing or rivet section 704. It has been found, in accordance with the invention, that this fact is not disturbing for the invention and also contributes to a reduction of the generation of chips.

Figure 22:
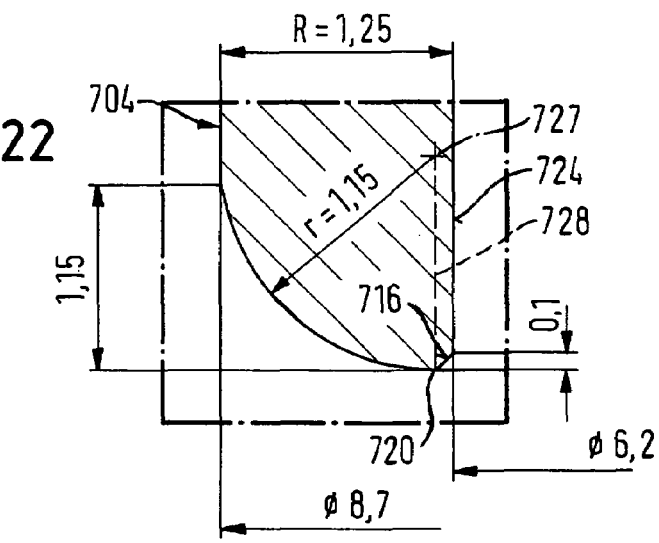

Since the FIGS. 22, 23 and 24 correspond to FIG. 21, apart from the specific dimensions it is not necessary to separately describe these Figures. Instead of this the same reference numerals have been inserted into the FIGS. 22, 23 and 24 as in FIG. 21 and the description of FIG. 21 is to be considered representative for the FIGS. 22, 23 and 24. All dimensions are contained in the drawings are recited in mm and can thus be taken from the drawing without problem.

It is furthermore pointed out that the precise form of the free end face of the piercing or rivet section 704 also applies for all fastener elements which are covered by this application, including also elements with the designation SBF, SBK, RSF and RSK and in all possible applications of the claimed fastener elements (including the above-described applications as a bearing journal, or a clip receiver or for the formation of a snap connection) and can also be used for these types of element when the intention is to avoid chips.

In all embodiments all materials can be named as an example for the material of the functional elements which are used for the-existing SBF, SBK, RSF and RSK elements. Such materials include alloys which in the context of cold deformation achieve strength values of the class 8 in accordance with the Iso standard, for example a 35B2 alloy in accordance with DIN 1654. The so formed fastener elements are suitable amongst other things for all commercially available steel materials for drawing quality sheet metal parts and also for aluminium or its alloys. Aluminium alloys, in particular aluminium alloys of high strength can also be used for the functional elements, for example AlMg5. Functional elements of higher strength magnesium alloys such as for example AM50 also come into question.

What is claimed is:

1. Fastener element (700) having a fastener section (702) and a tubular piercing or rivet section (704) having a radially inner side, a radially outer side, a central longitudinal axis, and a radial wall thickness (R) with the piercing or rivet section being designed for the attachment of the fastener element to a sheet metal part and with the fastener section being designed for the attachment of an article to the sheet metal part, wherein, in a region of transition from the fastener section (702) into the piercing or rivet section, a radially or conically extending contact surface (708) is provided and the tubular piercing or rivet section has at its free end face (714) on the radially inner side a conical inclined surface or cutting surface (716) which diverges in the direction of the free end face and at the radially outer side a rounded pressing and drawing surface (718), with the inclined surface or cutting surface (716) and the pressing and drawing surface (718) meeting at an annular end face edge (720) at the free end face of the piercing or rivet section (704), characterized in that the conical inclined surface or cutting surface (716) forms an hypotenuse of an imaginary right angled triangle with a limb length perpendicular to the central longitudinal axis (726) of the tubular piercing or rivet section (204) of 0.10 mm±0.03 mm, in that the radial wall thickness (R) of the tubular piercing or rivet section (704) is dimensioned as a function of an effective size of the fastener section; that the rounded pressing and drawing surface (718) has a radius of curvature (r) which is 0.1 mm±0.03 smaller than the respective radial wall thickness (R) and in that the centre of curvature (727) of the rounded pressing and drawing surface (718) lies on the surface of an imaginary cylinider (728) parallel to the central longitudinal axis which an imaginary cylinder's (728) surface, said cylinder parallel to an axis which extends away from the annular end face edge (720) in the direction of the fastener section (702) and is so positioned at a point along the piercing or riveting section (704) on the surface of the imaginary axially parallel cylinder (728) that a tangent (730) to the rounded pressing and drawing surface (718) stands perpendicular to the central longitudinal axis (726) at the annular end face edge (720).

2. Fastener element in accordance with claim 1, characterized in that the radial wall thickness (R) of the tubular piercing or rivet section (704) is dimensioned as follows as a function of the effective size of the fastener section:

size of 5 mm R=1.25±0.05 mm
size of 6 mm R=1.25±0.05 mm
size of 8 mm R=1.50±0.05 mm
size of 10 mm R=1.82±0.05 mm.

3. Fastener element in accordance with claim 1, characterized in that it is a bolt element and the fastener section is provided with a thread cylinder, or can be provided with a thread cylinder, said thread cylinder having an outer diameter which forms the effective size of the fastener section.

4. Fastener element in accordance with claim 1, characterized in that the fastener section is realized as a shaft part, with the outer diameter of the shaft part forming the effective size of the fastener section.

5. Fastener element in accordance with claim 1, characterized in that it is a nut element in which the fastener section has a bore which is provided with one of a bore having a bore diameter and a bore having an internal thread1 with an outer diameter with the respective one of said bore diameter and said outer diameter determining said effective size of said fastener section.

6. Fastener element in accordance with claim 1, characterized in that it is a hollow element which has a bore for the reception of a rotatable shaft in the fastener section, said bore having a diameter which determines the effective size of the fastener section.

7. Fastener element in accordance with claim 1, characterized in that it is a hollow element which has a bore adapted to receive a clip mounting, said bore having a diameter which determines the effective size of the fastener section.

8. Fastener element in accordance with claim 1, characterized in that the fastener section is realized as a shaft part to receive a rotatable journal with the outer diameter of the shaft part forming the effective size of the fastener section.

9. Fastener element in accordance with claim 1, characterized in that the fastener section is capable of being provided with features of shape for the formation of a snap connection with the outer diameter of the shaft part forming the effective size of the fastener section.

10. Fastener element in accordance with claim 1, characterized in that the fastener section is capable of being provided with a mount for a spring clip with the outer diameter of the shaft part forming the effective size of the fastener section.

11. Fastener element in accordance with claim 1, wherein the radially or conically extending contact surface (708) has features (710, 712) providing security against rotation.

* * * * *